United States Patent [19]

Hojo et al.

[11] Patent Number: 4,925,510

[45] Date of Patent: May 15, 1990

[54] METAL PARTS JOINT STRUCTURE AND METHOD FOR PRODUCING THE SAME

[75] Inventors: Nobuyoshi Hojo; Yoshiro Asai, both of Kyoto; Motoo Fujioka; Naotou Kobayashi, both of Hiroshima; Takashi Yamaguchi, Hiroshima, all of Japan

[73] Assignees: Ryobi Ltd., Hiroshima; Mitsubishi Jidosha Kogyo Kabushiki Kaisha, Tokyo, both of Japan

[21] Appl. No.: 894,532

[22] Filed: Aug. 8, 1986

[30] Foreign Application Priority Data

Aug. 12, 1985 [JP] Japan ............................ 60-124138[U]
Feb. 6, 1986 [JP] Japan ............................ 61-16709[U]
Jun. 30, 1986 [JP] Japan ............................ 61-100921[U]

[51] Int. Cl.$^5$ ............................................. B23B 7/08
[52] U.S. Cl. ....................................... 156/92; 156/153; 156/276; 156/330; 428/328; 523/442; 523/459
[58] Field of Search ............... 428/328; 523/442, 459; 156/92, 153, 330, 276

[56] References Cited

U.S. PATENT DOCUMENTS

| | | | |
|---|---|---|---|
| 2,140,672 | 12/1938 | Gray et al. | 156/92 |
| 3,193,424 | 7/1965 | Scott | 156/153 |
| 3,406,053 | 10/1968 | Jaenicke | 156/306.9 |
| 3,806,483 | 4/1974 | Juba et al. | 156/330 |
| 4,428,867 | 1/1984 | Billias et al. | 156/330 |

FOREIGN PATENT DOCUMENTS

49-30259 8/1974 Japan ............................ 156/276

*Primary Examiner*—John J. Gallagher
*Attorney, Agent, or Firm*—Sughrue, Mion, Zinn, Macpeak & Seas

[57] ABSTRACT

An aluminum part joint structure including at least two casted joint pieces to be assembled together, each of the pieces being formed with joint surfaces. Adhesive agent layer is provided between the joint surfaces. The adhesive agent comprises 45 to 54 wt % of epoxy resin, 30 to 40 wt % of aluminum particles each having diameter of 0.1 to 0.2 mm, and 4 to 6 wt % of guanidine derivative.

22 Claims, 8 Drawing Sheets

METAL PARTS JOINT STRUCTURE AND METHOD FOR PRODUCING THE SAME

BACKGROUND OF THE INVENTION

The present invention relates to precast parts joint structure and a method of joining the parts, and more particularly to a method of joining precast aluminum parts, for example, wherein the joined structure is used in an inlet-air surge tank, air surge tank or intake manifold.

Conventionally, since an inlet-air surge tank, an air surge tank and an intake manifold are hollow products formed in a complicated shape having many undercut portions, it has been difficult to form these structures integrally by die-casting using internal cores.

A method of forming a structure such as the inlet-air surge tank or the like, according to which two divisional pieces are preformed by die-casting and then bonded with each other by using epoxy group adhesives, has been proposed in Japanese early patent application publication No. 60-45771.

When the two die-cast pieces are bonded with each other by using the above-mentioned adhesives, the surfaces to be joined are supplied with adhesives, and then the surfaces are fastened by, for example, bolts. However, the layer of adhesives cannot be made uniform in thickness when the bolts are fastened. In particular, the adhesive layer becomes thinner near the bolts-fastening portions than in other portions. For example, the adhesive layer may be 0.3 mm thick in some portion and 0.02–0.05 mm thick in other portions. As a result, there are problems in obtaining sufficient bonding strength. Also, peeling-off may occur easily.

Conventionally, then, in order to provide a uniform adhesive layer, spacer plates (for example 0.1 mm in thickness) have been inserted. However, this method is disadvantageous not only in that a number of spacer plates are required, but also in that the step of inserting the spacer plates becomes necessary. Further, there is no adhesive layer where the spacer plates are inserted, so that sufficient bonding strength cannot be obtained.

SUMMARY OF THE INVENTION

As a result of studies on the problems of the prior art, the present invention has been attained. One object of the invention is to provide joint structure for parts of aluminum for which bonding strength on joint surfaces can be improved and a reduced cost can be achieved by simplifying steps, by making and using adhesives with aluminum filler having a particle diameter of 0.1–0.2 mm.

In view of the above-mentioned disadvantages, the present invention employs a method wherein the epoxy used to bond the precast pieces is mixed with metal particles, preferably of the same type of material as that from which the precast pieces are formed. The particles preferably have a diameter no greater than the thickness of the desired epoxy layer. As a result, a more uniform epoxy layer thickness is achieved.

The present invention solves the above-mentioned problems by joining together subdivided and preformed die-cast pieces with adhesives having 45–54 weight percent of epoxy resin, 30–40 weight percent of Al powder of 0.1–0.2 mm particle diameter, and 4–6 weight percent of guanidine derivative, thereby producing an integral construction. The joining surfaces are formed with projections through which bolts are engaged to tightly hold the joint parts. After joining, the resultant joined structure is heated to provide a metallurgically integral structure between the die-cast pieces and the adhesives. The joint surfaces may have a flat surface lying in one plane. Alternatively, the joint surfaces may each have at least two flat surfaces and may be bent at a right angle or an obtuse angle or any angle. That is, the surfaces to be joined need not be flat, as they can be bent in any shape which is compatible with the desired shape of the final product. Providing a bend at the joint surface may be advantageous if the final product has an extremely complicated structure.

BRIEF DESCRIPTION OF THE DRAWINGS

The invention will be described below with reference to the accompanying drawings, in which.

DETAILED DESCRIPTION OF THE PREFERRED EMBODIMENTS

Figure 1A:
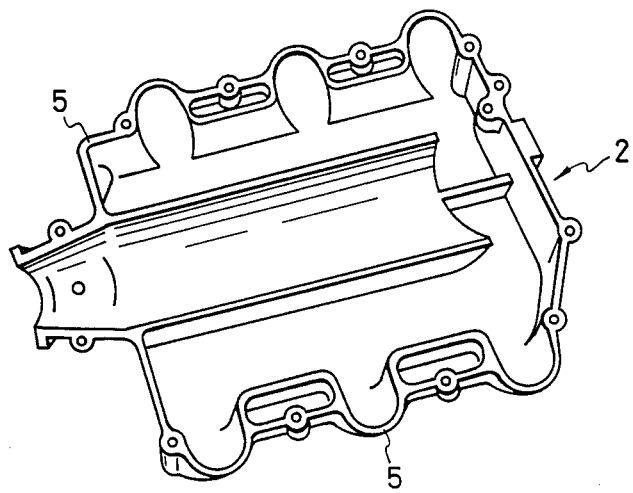
FIGS. 1(a) and 1(b) are perspective views showing respective divisional pieces molded by die-casting in an embodiment of the present invention in which an inlet-air surge tank is formed by the two divisional pieces.

Referring to the drawings, an embodiment according to the present invention now will be described.

The results of a bonding strength test performed by the present applicant on portions where separate members have been joined adhesively with each other now will be described.

(1) Relationship Between Pressing Force and Thickness of Adhesive Layer.

Epoxy resin group adhesives (including Al particles of 0.03 mm diameter) were applied onto a cold rolled steel plate (75×150 mm) used as a test piece. It was found that the thickness of the adhesive layer became extremely thin as a pressing force created by bolt-fastening was increased.

The measured values showed that the thickness of adhesives was about 0.15–0.2 mm when the fastening force by bolts was 1 kg/cm$^2$.

(2) Relationship Between Thickness of Adhesive Layer and Bonding Strength.

When epoxy resin group adhesives (including Al particles of 0.03 mm diameter) were applied onto a cold rolled copper plate used as a test piece, the thickness of the adhesive layer was 0.10 mm and the bonding strength (strength against peeling-off, strength against shearing) was high, while the bonding force was considerably lower when the thickness of the adhesive layer was 0.03 mm or less.

(3) Relationship Between Grain Size of Al Powder and Bonding Force.

As a result of the above-mentioned tests, it was found that the bonding force on the joint surfaces could be improved by incorporating filler of Al powder of 0.1–0.2 mm particle diameter in the adhesives so as to uniformly maintain the thickness of the adhesive layer at 0.1–0.2 mm on the joining surfaces under the pressing force caused by bolt-fastening.

Figure 1B:
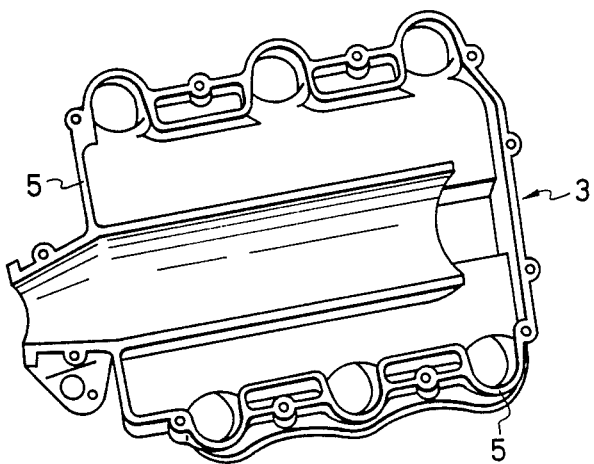
Figure 2:
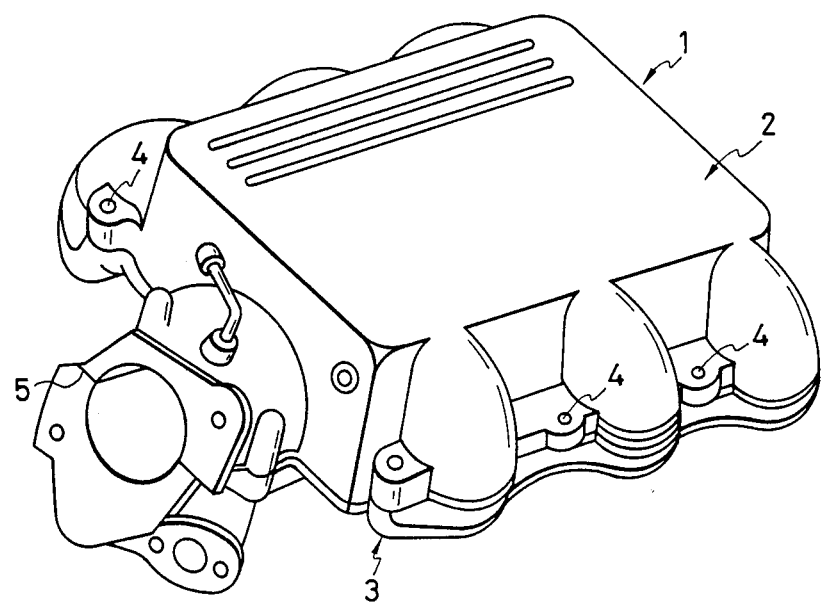
FIG. 2 is a perspective view showing the inlet-air surge tank formed by joining the die-casting pieces together using adhesives and bolts.

FIG. 1 shows divisional pieces 2 and 3 of an inlet-air surge tank which have been molded by die-casting, and FIG. 2 shows the air-inlet surface tank 1 which has been formed by joining the above-mentioned divisional pieces with each other by bolts 4 and adhesives.

The pieces 2 and 3 have been molded to a 2.5 mm thickness by die-casting by using an Al alloy (ADC 10 or ADC 12) for die-casting under the following casting conditions.

| Casting Conditions | |
|---|---|
| die-casting machine | 800 tons |
| bath temperature | 680° C. |
| casting pressure | 700 kg/cm$^2$ |
| temperature of metal mold | 200° C. |

The inlet-air surge tank 1 has been formed by joining the divisional pieces 2 and 3 molded under the above-mentioned conditions by steps which will be described later.

After machining the divisional pieces to a surface roughness of 10 S to 30 S, the respective joint surfaces 5 of the divisional pieces 2 and 3 were supplied with adhesives containing Al powder of 0.1–0.2 mm particle diameter by using an NC coating machine (not shown). The NC coating machine in which a Toffky 1300A type robot was used, was produced by Sumitomo 3M Co., Ltd. The Toffky 1300A is an industrial robot capable of applying a coating in a complicated coating locus with a maximum speed is 200 mm/s, and pneumatic pressure is 410 kgf/cm$^2$. The divisional pieces 2 and 3 were fastened by bolts 4, and then heated in a continuous furnace (at 120° C.–160° C., for 10–30 minutes) to integrally form the inlet air surge tank 1.

The foregoing adhesives had the following composition:

| | |
|---|---|
| Epoxy resin | 50 wt % |
| Al powder (particle diameter 0.1 mm) | 35 wt % |
| nitrile rubber | 5 wt % |
| guanidine derivative (hardening agent) | 5 wt % |

Figure 3A:
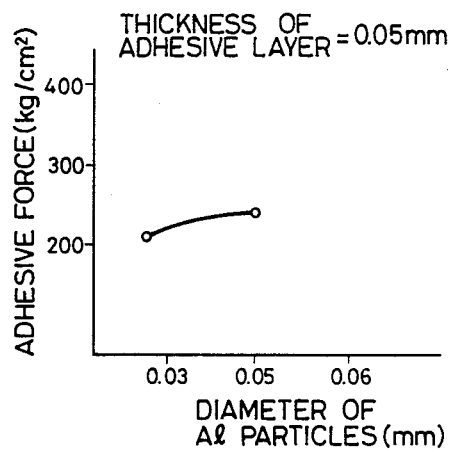
FIGS. 3(a)–3(d) are graphs showing the relationship between the bonding force and the particle diameter of Al powder in the adhesives for bonding the die-cast pieces in the same embodiment.
Figure 3B:
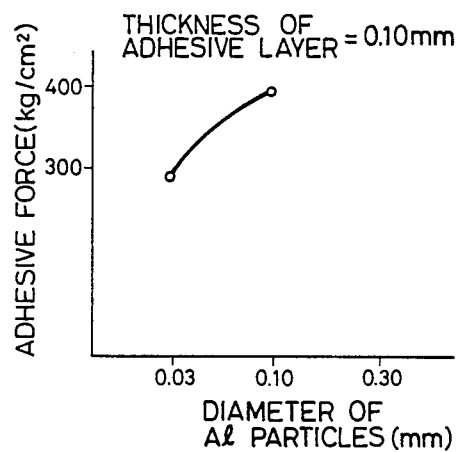
Figure 3C:
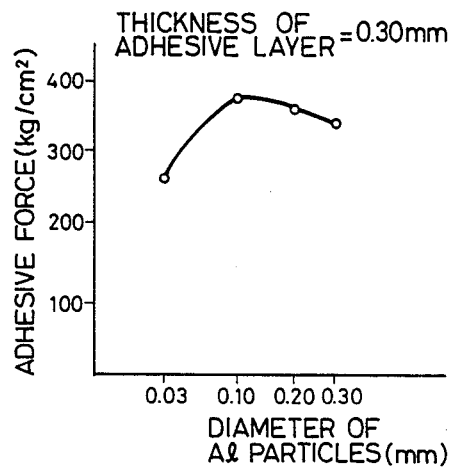
Figure 3D:
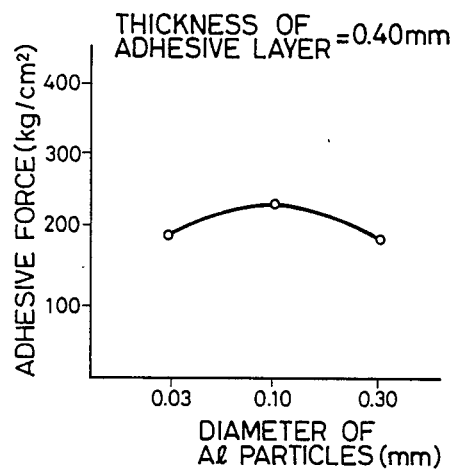

FIGS. 3(a)–(d) are graphs showing the relationship between the particle diameter of Al particles (horizontal axis) and the bonding force (vertical axis). In these Figures, where the layer thickness of the adhesives is 0.10 mm or 0.30 mm on the joint surfaces 5, which have been supplied with adhesives and then fastened by the bolts 4, the bonding force is strong when the particle diameter of Al powder is within a range of from 0.10 to 0.30 mm. Where the layer thickness was thin such as 0.05 mm, and where the layer thickness was thick such as 0.40 mm, sufficient bonding force was not obtained as shown in FIGS. 3(a) and 3(d).

It should be noted that the particle diameter of the Al powder is always selected so as not to be larger than the desired thickness of the adhesive layer.

Figure 4:
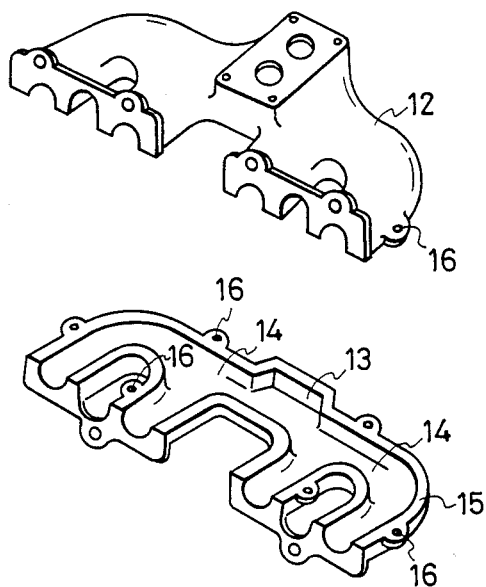
FIG. 4 is a perspective view showing two divisional pieces in a second embodiment of the present invention in which an intake manifold is formed.
Figure 5:
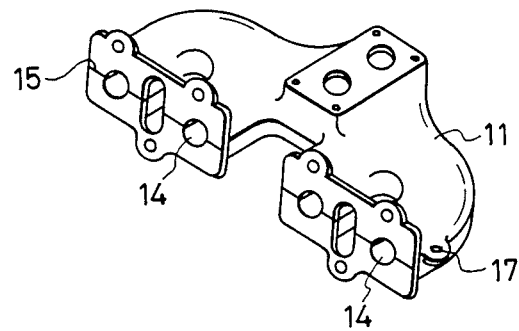
FIG. 5 is a perspective view showing the intake manifold formed by joining the pieces together using adhesives and bolts.

A second embodiment of the present invention is shown in FIGS. 4 and 5. In FIG. 4, each of two subdivided casting pieces 11 and 13 is formed with an air inlet portion 14 and a joint surface 15. A plurality of projections 16 are provided at the joint surfaces 15. In FIG. 5, an intake manifold 11 is shown which is provided by joining the pieces 12, 13 by bolts 17 and adhesive.

The subdivided pieces 12, 13 are easily produced by a die-casting or gravity-casting method. For example, the pieces 12 and 13 have been molded by die-casting by using an Al alloy (ADC 10 or ADC 12) under the following casting conditions.

| | |
|---|---|
| ADC10 | Cu: 2.0–4,0% |
| | Si: 7.5–9.5% |
| | Mg: not more than 0.3% |
| | Zn: not more than 1.0% |
| | Fe: not more than 1.3% |
| | Mn: not more than 0.5% |
| | Ni: not more than 0.5% |
| | Sn: not more than 0.3% |
| | Al: balance |
| ADC12 | Cu: 1.0–4.0% |
| | Si: 10.5–12.0% |
| | Mg: not more than 0.3% |
| | Zn: not more than 1.0% |
| | Fe: not more than 1.3% |
| | Mn: not more than 0.5% |
| | Ni: not more than 0.5% |
| | Sn: not more than 0.5% |
| | An: balance |
| Casting Conditions | |
| die-casting machine | 800 tons |
| bath temperature | 680° C. |
| casting pressure | 700 kg/cm$^2$ |
| temperature of metal mold | 200° C. |

The intake manifold 11 has been formed by joining the divisional pieces 12 and 13 molded under the above-mentioned conditions by steps which will be described later.

After machining the divisional pieces to a surface roughness of 10 S–30 S, the respective joint surfaces 15 of the divisional pieces 12 and 13 were supplied with adhesives containing Al powder of 0.1–0.2 mm particle diameter by using an NC coating machine (not shown), and fastened by bolts 17, and then heated in a continuous furnace (at 120° C.–160° C., for 10–30 minutes) to integrally form the intake manifold.

Here, the foregoing adhesives had the following composition:

| | |
|---|---|
| epoxy resin | 50 wt % |
| Al powder (particle diameter 0.1 mm) | 35 wt % |
| nitrile rubber | 5 wt % |

| -continued | |
|---|---|
| guanidine derivative (hardening agent) | 5 wt % |

Third to fifth embodiments according to the present invention will be described with reference to FIGS. 6 to 12. In the foregoing embodiments, joint surfaces are flat as shown. However, in the third to fifth embodiments, the joint surfaces are bent at a right angle or an obtuse angle or any angle. That is, in one joint surface there are at least two flat surfaces intersecting at a right angle or obtuse angle or any desired angle so as to produce a joint structure having a complicated structure. Further, the intersecting line extends linearly. Bent surfaces of the two joint pieces are joined together by adhesives described above.

Figure 6:
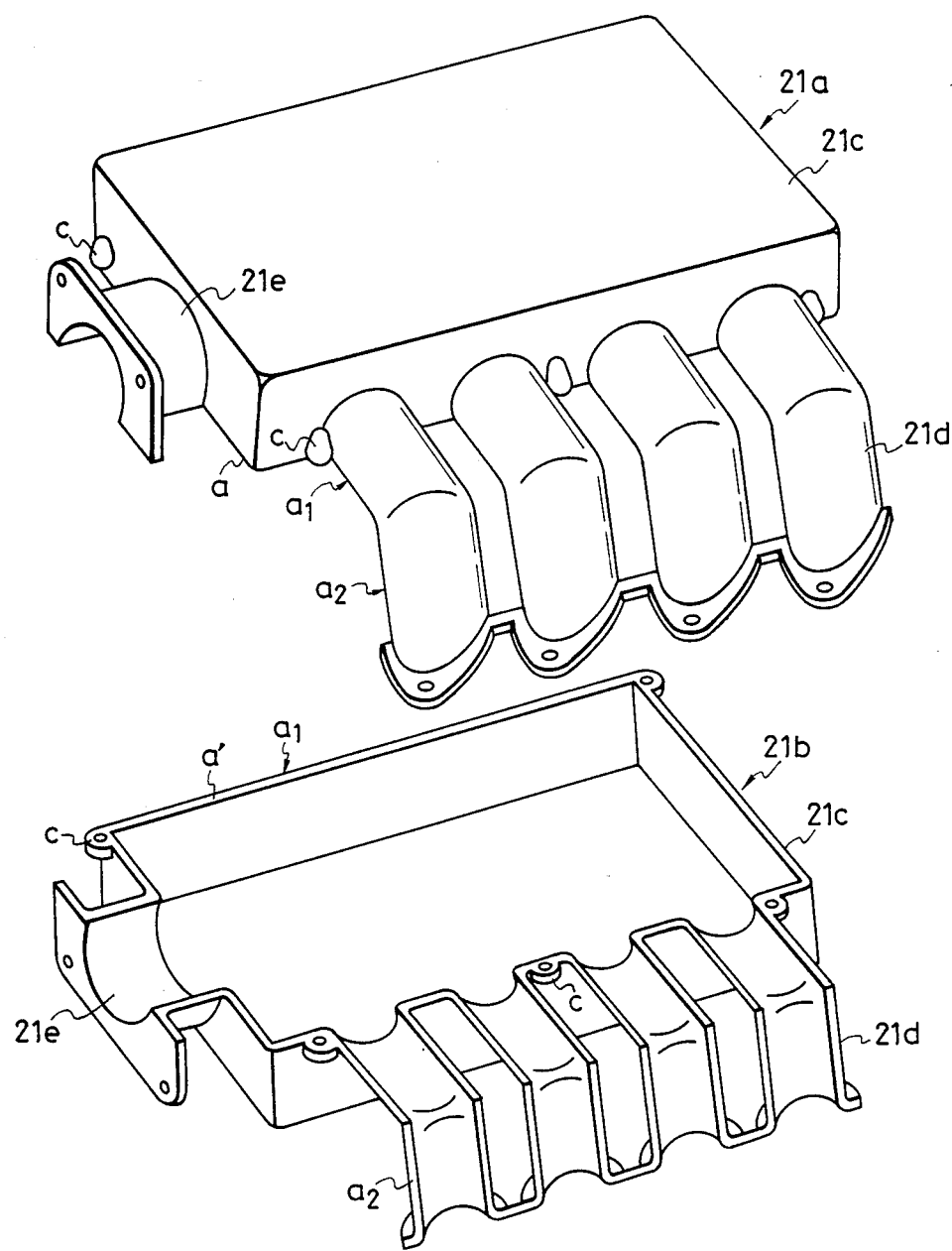
FIG. 6 is a perspective view showing two divisional pieces in a third embodiment of the invention in which an intake air surge tank is formed by the two divisional pieces.
Figure 7:
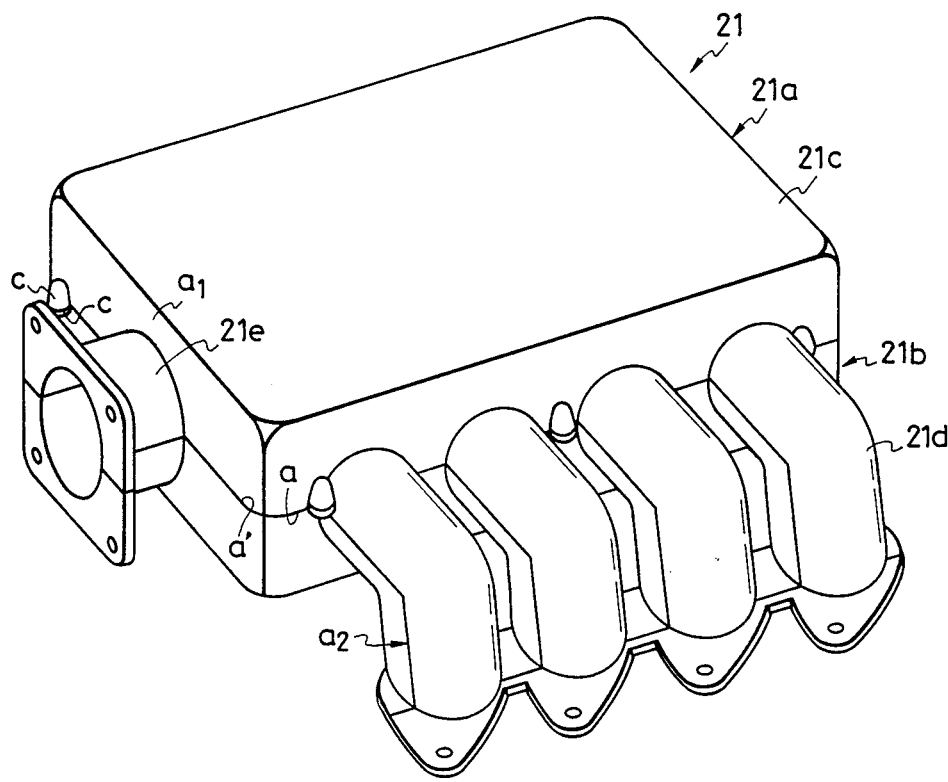
FIG. 7 is a perspective view showing the intake air surge tank formed by joining the pieces shown in FIG. 6.
Figure 8:
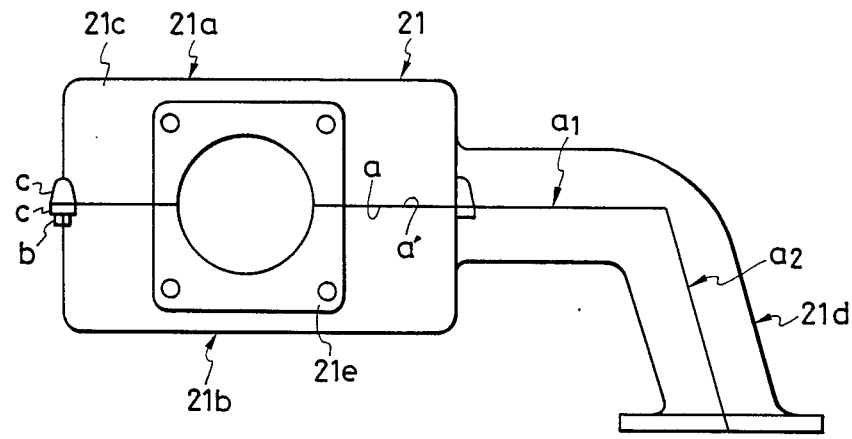
FIG. 8 is a side view showing the intake air surge tank shown in FIG. 7.

FIGS. 6 to 8 show a third embodiment according to the present invention in which an intake air surge tank 21 is provided. As shown in FIG. 6, upper and lower divisional pieces 21a and 21b are prepared each having bending bent joint surfaces a and a'. In FIG. 7, two joint pieces 21a and 21b are joined together by adhesives applied between the joint surfaces a and a'. Bolts b are used to fasten these pieces together to provide the intake air surge tank 21 having an integral construction. FIG. 8 is a side view of the intake air surge tank 21.

Figure 9:
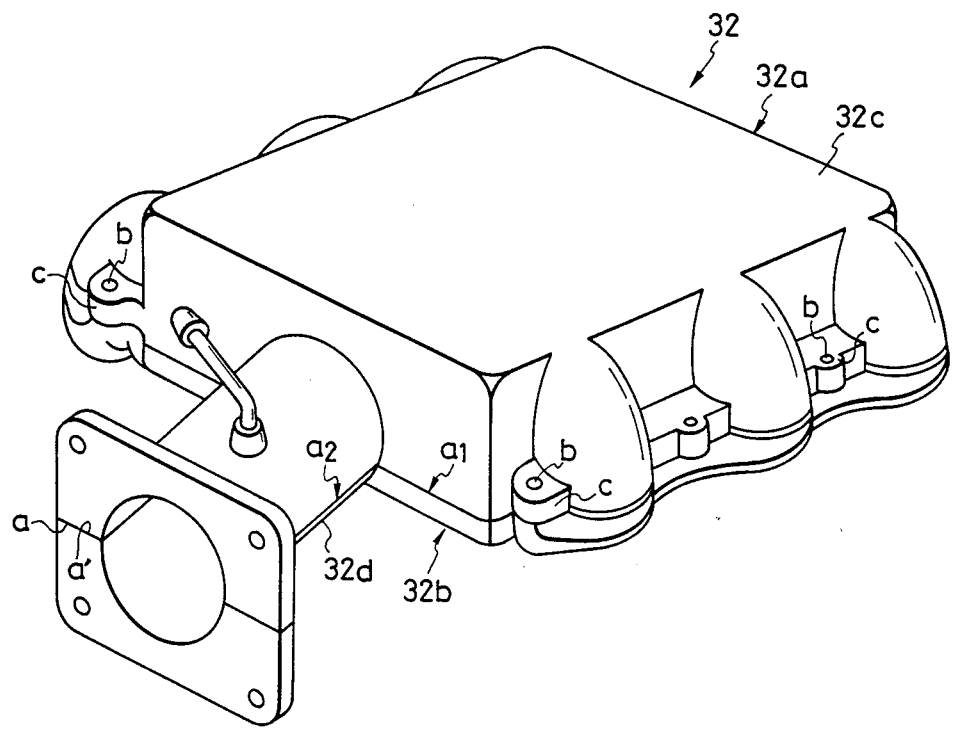
FIG. 9 is a perspective view showing a fourth embodiment of the present invention in which an air surge tank is provided by joining the two divisional pieces.
Figure 10:
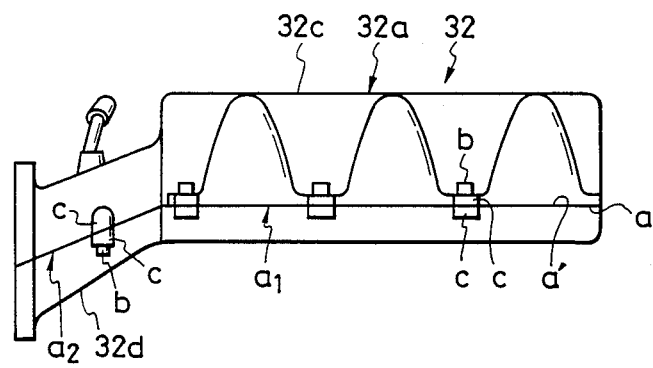
FIG. 10 is a side view of FIG. 9.

FIGS. 9 and 10 show a fourth embodiment of the present invention in which an air surge tank 32 is provided. As shown two divisional pieces 32a and 32b are joined together by adhesives at bent joint surfaces a and a', and bolt b is used to fastened the pieces together. FIG. 10 is a side view of the air surge tank.

Figure 11:
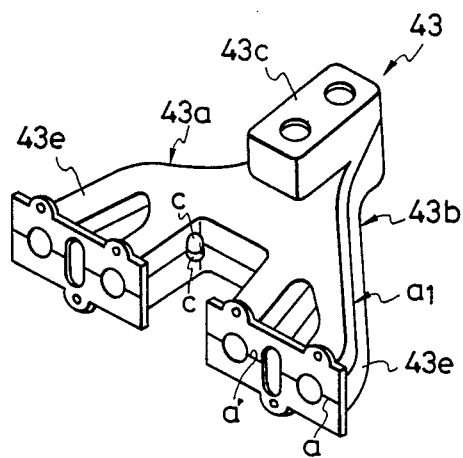
FIG. 11 is a perspective view showing a fifth embodiment of the present invention in which an intake manifold is provided by joining the two divisional pieces.
Figure 12:
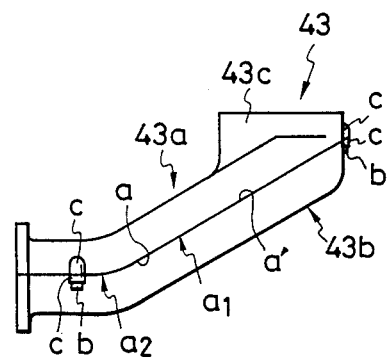
FIG. 12 is a side view of FIG. 11.

FIGS. 11 and 12 show a fifth embodiment according to the present invention in which an intake manifold 43 is provided. As shown, upper and lower joint pieces 43a and 43b are joined together by adhesives described above at bent joint surfaces a and a', and bolt b is used to fastened the pieces together. FIG. 11 shows a side view of the intake manifold 12.

In the third to fifth embodiments, divisional joint pieces 21a 21b, 32a 32b, and 43a 43b are produced by a die-casting or gravity casting method. As an example, these pieces are produced by die-casting method, and applied to the third to fifth embodiments described below.

In FIGS. 6–8, the intake air surge tank 21 includes a tank portion 21c and an intake air pipe 21d extending horizontally from one end surface of the tank portion 21c and bent downwardly and outwardly. The surge tank 21 also provides a connecting pipe 21e adapted to be connected to a throttle valve (not shown). The connection pipe 21e extends from the tank end, and extends perpendicular to the intake pipes 21d. Therefore, each of the divisional joint pieces 21a and 21b is formed with a first flat joint surface $a_1$ consisting of the tank portion 21c, horizontal portions of the intake pipes 21d and a central portion of the connecting pipe 21e, and a second joint surface $a_2$ consisting of slanting portions of the intake pipes 21d. The two surfaces $a_1$ and $a_2$ intersect with each other at an obtuse angle to provide bent joint surfaces a and a' of the joint pieces 21a and 21b, respectively.

In FIGS. 9 and 10, the air surge tank 32 includes a tank portion 32c and a connecting pipe 32d adapted to be connected to a throttle valve (not shown). The connecting pipe 32d extends from the tank portion 32c in a downward direction. Therefore, as shown in FIG. 10, each of the joint pieces 32a and 32b is formed with a first horizontal joint surface $a_1$ disposed at a lower portion of the resultant tank portion 32c and a second slant joint surface $a_2$ at the connecting pipe 32d. The surfaces $a_1$ and $a_2$ intersect at an obtuse angle, and these provide joint surfaces a and a' of the joint pieces 32a and 32b, respectively.

In FIGS. 11 and 12, the intake manifold 43 includes a carburetor attaching portion 43c and a plurality of symmetrically arranged intake tubes 43d extending downwardly from the attaching portion 43c. Free ends of the tubes 43d extend in a horizontal direction. Therefore, the upper and lower joint pieces 43a and 43b each provide slant joint surface $a_1$ defined by the carburetor attaching portion 43c and the intake tubes 43d, and a horizontal joint surface $a_2$ defined by the free end portions of the intake tubes 43d. These two surfaces $a_1$ and $a_2$ intersect with each other at an obtuse angle to provide bent joint surfaces a and a' of the pieces 43a and 43b, respectively.

In the third to fifth embodiments, the bent joint surfaces a and a' may intersect at a right angle or any other angle in accordance with the shape of the final product. The surfaces $a_1$ and $a_2$ are both flat surfaces, so that it is advantageous to subject them to surface machining by using a milling machine. Such surface treatment is required in order to remove contamination at the casted product surface due to defatting which degrades adhesion property. Further, these flat surfaces intersect with each other at a given angle to provide bent joint surfaces a and a', since it is difficult to provide a single flat joint surface throughout its area due to the restriction attendant to the shape of the final product. Furthermore, each of the joint pieces is formed of aluminum alloy (ADC10 or ADC12). The joint pieces are produced by casting under the same casting conditions as those of the first and second embodiments. After die-casting, using a milling machine, the joint pieces were subjected to surface treatment at the joint surfaces so as to obtain surface roughness of 10 S–30 S. Then the above-mentioned epoxy adhesives containing therein aluminum particles whose particle size is 0.1 to 0.2 mm were coated on at least one joint surface by a NC coating machine. Thereafter, bolts were fastened with projections c and c' provided at the joint surfaces. Finally, the integral structure was heated by a continuous furnace at a heating temperature of 120°–160° C. for 10 to 30 minutes, to thereby produce joint structures shown in FIGS. 6–12 having an integral construction.

In the thus formed joint structure parts of aluminum according to the present invention, the layer of adhesives can be made uniform in thickness and made to have an ideal thickness of 0.1–0.2 mm according to the result of experiments, by incorporating Al powder of 0.1–0.2 mm particle diameter, as a filler, into the adhesives for joining the divisional pieces molded by die-casting. By so doing, not only is it possible to obtain products having large bonding strength and stable quantity because the bonding strength on the joint surfaces is large without scattering, but also the producing cost can be reduced because the steps can be simplified in comparison with the prior art, and so forth.

Further, since the intake manifold or the surge tank can be produced without using the internal core, production cost can be lowered. Furthermore, since the internal surface of the inlet or intake passages can be smoothly produced, fluid flowing resistance can be minimized during operation, to thereby enhance engine performance.

In addition in the present invention, joint surfaces of the two divisional parts which are bent such that two flat joint surfaces intersect at a right angle, an obtuse angle or any desired angle, can be produced so that an intake manifold, inlet air surge tank, or air surge tank having a complicated shape can be produced.

Further, a present invention can provide the final joint structure having excellent external appearance, since joint pieces having complicated structure can be produced prior to joining the pieces, and the pieces are coupled together firmly with the above specified adhesives.

What is claimed is:

1. A method of producing a metal part joint structure comprising the steps of:
    preparing at least two cast metal joint pieces, each of said pieces being formed with a joint surface;
    applying adhesives between said joint pieces and joining said joint pieces so as to seal them together, said adhesive comprising 45 to 54 wt% of epoxy resin, 30 to 40 wt% of metal particles, each of said particles having a diameter of 0.1 to 0.2 mm, said particles functioning as a spacer, and 4 to 6 wt% of guanidine derivatives; and, heating said joined pieces for metallurgical integration between said pieces and said adhesive.

2. The method of claim 1, wherein said joint surfaces are provided with projections each formed with a hole, and further comprising the step of fastening a plurality of bolts with said holes to provide tight coupling between said joint pieces prior to said heating step.

3. The method of claim 1, wherein said adhesive is applied between said joint surfaces to provide coating thickness of 0.10 to 0.20 mm.

4. The method of claim 1, wherein said joint pieces are prepared by die-casting method.

5. The method of claim 1, wherein said joint pieces are prepared by gravity casting method.

6. The method of claim 1, further comprising the step of machining said joint surfaces prior to said adhesive application.

7. The method of claim 1, wherein said joint pieces are joined to form an inlet-air surge tank.

8. The method of claim 1, wherein said joint pieces are joined to form an air surge tank.

9. The method of claim 1, wherein said joint pieces are joined to form an intake manifold.

10. The method of claim 1, wherein said heating step is performed at a temperature of 120° to 160° C. for 10 to 30 minutes.

11. A joint structure for metal parts, comprising:
    at least two cast joint pieces to be assembled together, each of said pieces being formed with a joint surface, and
    an adhesive agent layer applied between said joint surfaces, said adhesive agent comprising;
    45 to 54 wt% of epoxy resin,
    30 to 40 wt% of aluminum particles, each particle having a diameter of 0.1 to 0.2 mm, wherein said aluminum particles function as a spacer, and
    4 to 6 wt% guanidine derivative.

12. The structure of claim 11, wherein said adhesive agent layer has a uniform thickness, and said particle diameter is smaller than the thickness of said layer.

13. The structure of claim 12, wherein said joint pieces are formed of aluminum.

14. The structure of claim 12, wherein said particles are present in said epoxy in an amount of approximately 35 wt%, and epoxy resin being present in an amount of approximately 50 wt%.

15. The structure of claim 11, wherein said joint surfaces are provided with projections each formed with a hole, and further comprising a plurality of bolts extending through said holes.

16. The structure of claim 11, wherein said joint pieces are provided by die-casting method.

17. The structure of claim 11, wherein said joint pieces are provided by gravity casting method.

18. The structure of claim 11, wherein said joint surface is at one horizontal plane.

19. The structure of claim 11, wherein said joint surface includes a first flat plane and a second flat plane intersecting said first flat plane at a predetermined angle, the intersecting line being linearly extended.

20. The structure of claim 11, wherein said joint structure is an inlet-air surge tank.

21. The structure of claim 11, wherein said joint structure is an air surge tank.

22. The structure of claim 11, wherein said joint structure is an intake manifold.

* * * * *